United States Patent Office 3,175,674
Patented Mar. 30, 1965

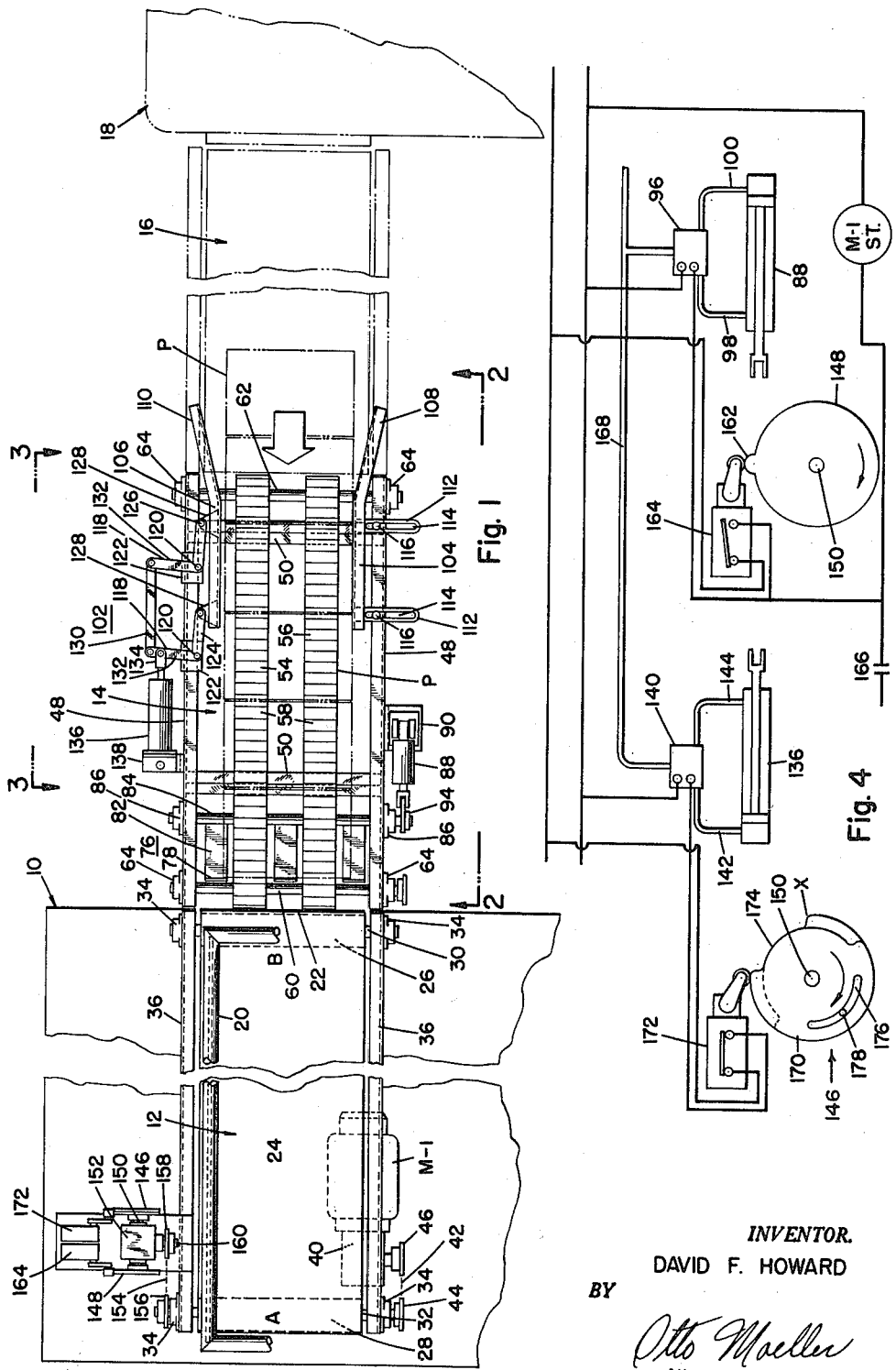

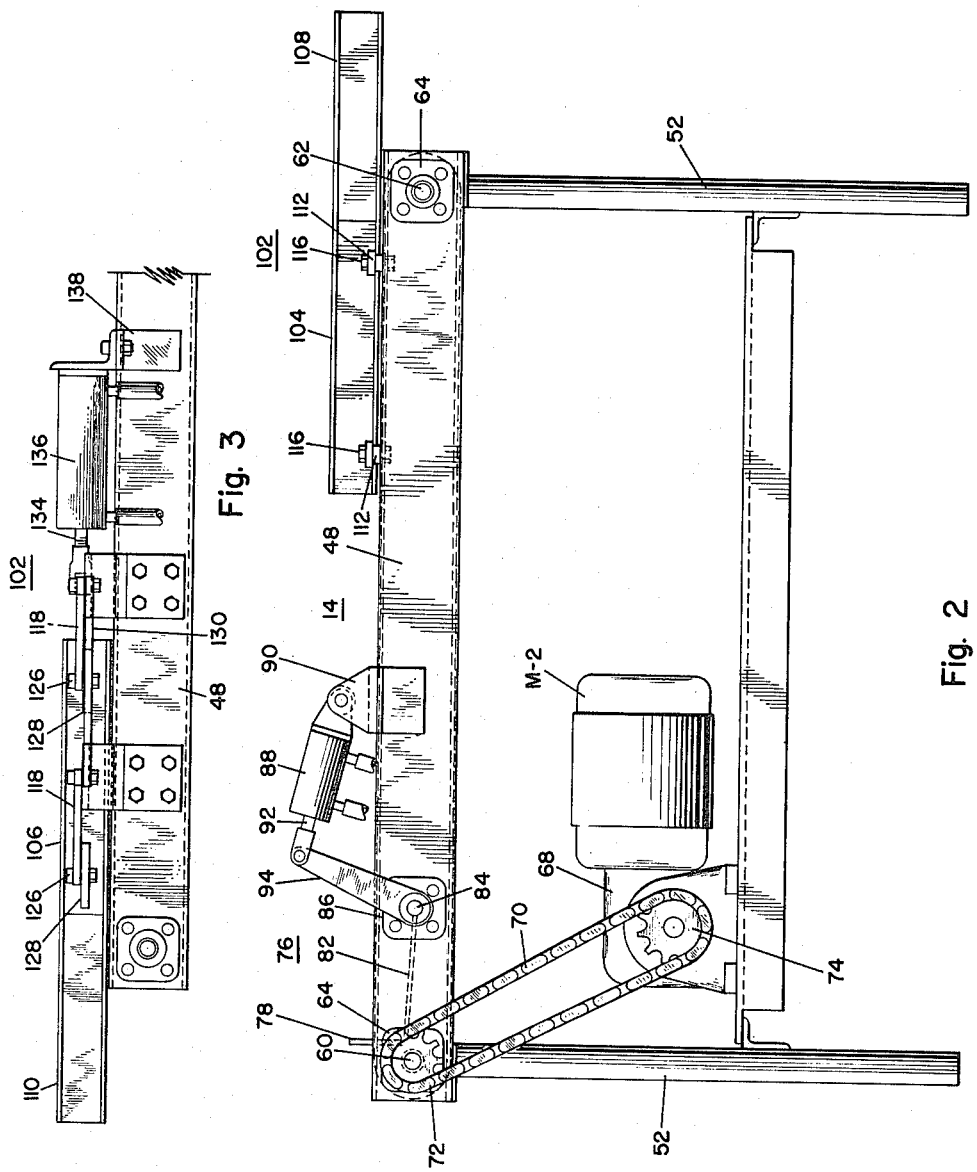

3,175,674
CONVEYORS FOR GROUPING ARTICLES
David F. Howard, Red Lion, Pa., assignor, by mesne assignments, to Baker Perkins Inc., New York, N.Y., a corporation of New York
Filed Sept. 18, 1961, Ser. No. 138,990
5 Claims. (Cl. 198—34)

This invention relates in general to conveying systems embodying article grouping means and more specifically to conveying systems for releasing groups of articles at regular intervals and spacing the articles in each group.

This invention finds particular utility in the baking industry for handling baking pans, and being particularly adaptable for handling of flat bun pans in transit to a cooler, it is so shown in the drawings and hereinafter described, though it will be apparent that the invention finds application to transfer of bread pans to a proofer or oven, as shown for example in Temple Patent No. 2,595,022 and Temple Patent No. 2,823,811.

An important feature of the invention resides in the provision in such pan handling means, of simple and improved means including a continuously operating conveyor having means for intermittently accumulating thereon and releasing a plurality of pans, and pan arresting means upstream of and operating in timed relation with the pan accumulating and releasing means for preventing more than a predetermined number of pans from being released by the accumulating and releasing means during its pan releasing period.

Another object of the invention is to provide a conveying system embodying pan grouping and releasing means for automatically delivering successive groups of pans transversely alined in the front of an oven, proofer or cooler, as the case may be, in such position in front of and between the ends of a pusher adapted to sweep such successive rows onto successive traveling trays or shelves of the oven, proofer or cooler, so as to prevent fouling or jamming of pans against the side walls or other stationary part of the oven, proofer or cooler during the sweeping stroke of the pusher.

A further object is to provide a conveying system embodying pan grouping and releasing means for arranging successive groups of pans in the manner set forth above irrespective of whether pans are delivered to the pan grouping and releasing means in a solid or irregularly broken row.

A further object is to provide a conveying system that not only groups pans as described hereinabove, but that also spaces the individual pans of successive groups.

Other objects and advantages reside in certain novel features of the construction, arrangement and combination of parts which will be hereinafter more fully described, reference being had to the accompanying drawings forming a part of this specification, and in which drawings:

FIGURE 1 is a plan view of the invention as applied to a system for transferring pans of baked products from an oven to a cooler;

FIGURE 2 is a side elevation taken on line 2—2 of FIGURE 1, showing the gate operating means of the conveying system;

FIGURE 3 is a side elevation taken on line 3—3 of FIGURE 1, showing the clamp operating means of the conveying system; and FIGURE 4 is a diagrammatic view showing the control system for the various elements of the invention.

Referring to FIGURE 1 of the drawings, the invention is illustrated therein as embodied in a conveyor system for delivering pans of baked products to the inlet end of a cooler 10, from whence they are pushed in successive transverse rows onto travelling means (not shown) for conducting the pans through the cooler. Since the invention is applicable to various types of coolers well known in the art, only those elements necessary to an understanding of the invention are shown in the drawings.

Considering the structure and operation of the conveyor system in a general way, it includes an endless cooler loading conveyor 12, an endless pan accumulating and releasing conveyor 14 from which successive ranks of pans are delivered at spaced intervals onto the cooler loading conveyor 12, and an endless conveyor or conveyors 16 on which the pans may be haphazardly spaced as they are conveyed thereby from an oven 18 to the pan accumulating and releasing conveyor 14. An intermittently operating reciprocating pusher 20 pushes successive ranks of pans from the cooler loading conveyor 12 onto suitable traveling means for conducting the pans through the cooler 10.

The cooler loading conveyor 12, which may be a belt, slat or other suitable type of endless conveyor, is horizontally disposed in the forward portion of the cooler 10 and extends transversely thereof. The infeed end of conveyor 12 is disposed adjacent an opening 22 in the side wall of the cooler 10 through which opening the pans are delivered from the pan accumulating and releasing conveyor 14 and pass into the cooler. For purpose of illustration, the loading conveyor is shown as comprising a belt 24 trained around guide and driving rollers 26 and 28, respectively, these rollers being carried by shafts 30 and 32, respectively, suitably journaled in bearings 34 supported on side frame members 36 of the conveyor 12. The driving roller 28 is operated from electric motor M-1 through suitable means as a gear reducer 40 and a sprocket chain 42 trained around sprockets 44 and 46 mounted, respectively, on an extension of driving roller shaft 32 and an output shaft of the gear reducer 40.

The pusher 20 which is arranged for reciprocating movement across the top run of the conveyor 12 may be of any suitable type commonly employed for sweeping pans from a loading conveyor onto traveling means of a cooler or proofer as, for example, the pusher shown in Temple Patent No. 2,823,811.

The pan accumulating and releasing conveyor 14 includes a pair of side frame members 48 retainer in laterally spaced relation by suitable cross bars 50, and is supported in any suitable manner above the floor, as by leg standards 52. A pair of endless conveyor elements 54 and 56 are disposed between the side frame members 48 in parallel spaced relation therewith and in parallel spaced relation with respect to each other. The endless conveyor elements 54 and 56 may be of any suitable construction each preferably comprising a plurality of plates 58, respectively connected to the links of a chain (not shown), each chain being trained around sprockets (not shown) mounted on a shaft 60 adjacent the pan discharge end of conveyor 14 and a shaft 62 adjacent the pan receiving end thereof. Shafts 60 and 62 are suitably journaled in bearings 64 supported on side frame members 48. As shown in FIGURE 2, the endless conveyor elements 54 and 56 are operated from electric motor M-2 by means including a gear reducer 68 and a sprocket chain 70 trained around sprockets 72 and 74 mounted, respectively, on an extension of shaft 60 and an output shaft of the gear reducer 68.

Associated with the discharge end of the pan accumulating and releasing conveyor 14 is an escapement means 76. The escapement means 76 includes pan blocking means or gates 78 disposed between the conveyor elements 54 and 56, and between the conveyor elements 54, 56 and the side frame members 48 of the conveyor 14 which, as hereinafter described, are movable between an extended position wherein they are disposed in the path of pans P on the conveyor elements 54 and 56 to intercept and block such pans, and a retracted position wherein they are withdrawn downwardly out of such path to permit pans to pass to the loading conveyor 12. The gates 78 are located as near as practicable to the discharge end of the conveyor 14 and are arranged to be moved between extended and retracted position by means of the gate lever arms 82 which are secured to an oscillatable shaft 84 disposed upstream of shaft 60 and journaled in suitable bearings 86 supported on side frame members 48.

In extended position, the gates 78 arrest a leading pan so that succeeding pans, which as previously noted are delivered from the oven in haphazard spaced manner, may back up behind the lead pan on the conveyors 14 and 16 in a consolidated row as shown in FIGURE 1, while the continuously operating conveyor elements 54 and 56 of the conveyor 14 and similar or equivalent conveyor elements of the conveyor 16 slide against the bottoms of the arrested row of pans. Whether one or more pans are backed up against the gates 78 during the raised position thereof will of course depend on the spacing between pans as delivered from the oven 18.

The operating means for oscillating shaft 84 to thereby move the gates 78 between extended and retracted position includes an air cylinder 88 which is pivotally supported on a bracket 90 rigidly secured at one side of conveyor 14 to one of the side frame members 48. The free end of the piston rod 92 of the air cylinder 88 is pivotally connected to one end of a crank 94, the other end of the crank 94 being rigidly secured to an extension of the shaft 84. Solenoid operated valve 96, FIGURE 4, controls admission of air to one end or the other of the air cylinder 88 through lines 98 and 100 for raising or lowering the gates 78. The actuating means for the solenoid operated valve 96 will be described hereinafter in detail.

The pan accumulating and releasing conveyor 14 is provided upstream from the escapement means 76 with a pan grouping clamping means 102. The pan grouping clamping means 102 includes clamping elements 104 and 106 disposed at opposite sides of the conveyor 14. The clamping elements 104 and 106 are in the form of parallel vertically disposed longitudinally extending plates, the upstream ends of which are provided with diverging pan guides 108 and 110 for guiding the pans from the conveyor 16 onto the conveyor 14 between the clamping elements 104 and 106. One of the clamping elements, the clamping element 104 for example, is rigidly but adjustably secured to a side frame member 48. For this purpose, the clamping element 104 is provided with laterally outwardly projecting brackets 112 having elongated slots 114 through which extend thumb screws 116 threaded into side frame member 48. Thus, by loosening the thumb screws 116, the clamping element 104 may be moved toward or away from the conveyor elements 54 and 56 to accommodate different width pans and can be secured in adjusted position by tightening the thumb screws 116.

The other clamping element 106 is supported on the opposite side frame member 48 for movement toward and away from the rigid clamping element 104, between pan gripping and pan releasing positions. In pan releasing position, the clamping elements 104 and 106 are spaced apart a distance as shown in FIGURE 1, to permit pans to be freely advanced therebetween by the continuously operating conveyor elements 54 and 56. At predetermined intervals and in timed relation with the operation of the escapment means 76, the clamping element 106 moves toward the rigid clamping element 104 to grip a pan therebetween, thereby holding such pan and succeeding pans from advancing while the continuously operating conveyor elements 54 and 56 and the conveying element of the conveyor 16 slide beneath the retained pans, whereby to insure against a pan being over the gates at the time they move to their raised position, as and for the purpose hereinafter described.

The means for moving the clamping element 106 includes a pair of longitudinally spaced bell cranks 118, each pivotally connected as at 120, for pivotal movement in a horizontal plane, on a respective one of a pair of longitudinally spaced brackets 122 secured to a side frame member 48. The free end of one arm 124 of each of the bell cranks 118 is connected by a vertical pivot 126 to a respective one of a pair of longitudinally spaced lugs 128 secured to the clamping element 106. A link 130 pivotally connects the free ends of the other arms 132 of the bell cranks 118, so that by moving either of the arms 132, the two bell cranks 118 move in unison to move the clamping element 106 laterally while maintaining its clamping face in parallelism with the clamping face of the rigid clamping element 104. The free end of the piston rod 134 of an air cylinder 136 is pivotally connected to an arm 132 of one of the bell cranks 118, the air cylinder 136 being secured to a bracket 138 carried by side frame member 48 on that side of the conveyor 14 opposite the air cylinder 88. Solenoid operated valve 140 controls admission of air to one end or the other of the air cylinder 136 through lines 142 and 144 for moving the clamping element 106 between pan retaining or closed position and pan releasing or open position.

The operations of the escapement means 76 and the clamping means 102 are controlled and maintained in timed relation by respective actuating cams 148 and 146, which cams are rotated by loading conveyor 12. For this purpose, cams 146 and 148 are fixed on output shaft 150 of a gear reducer 152. A sprocket chain 154 trained over a sprocket 156 fixed on an extension of the driving shaft 32 of the loading conveyor 12 and over a sprocket 158 fixed on the input shaft 160 of gear reducer 152 effects rotation of the cams 146 and 148 by the loading conveyor 12. The loading conveyor 12 is preferably operated at a greater linear speed than the conveyor elements 54 and 56 in order to insure a space between successive pans of a row of pans delivered from conveyor elements 54 and 56 to loading conveyor 12 whereby a more efficient circulation of air is effected as the spaced pans move through the cooler.

The reduction between loading conveyor 12 and cams 146 and 148 is such that the cams 146 and 148 make one revolution for a linear travel, hereinafter referred to as a linear loading travel, of conveyor 12 necessary to move the leading pan of a group from a position alined with the gates 78 to a position near the left hand end of the conveyor 12, as viewed in FIGURE 1, and which is designated by the letter A. The position A is selected to permit a maximum number of spaced pans to enter the cooler 10 with the leading pan in position to be pushed from the conveyor 12 onto the traveling means of the cooler without fouling against any part of the cooler.

In order to stop conveyor 12 when it has made a linear loading travel, the cam 148 is provided with a node 162, and since as previously stated the cam 148 is arranged to make one revolution per linear loading travel of conveyor 12, the node 162 engages and holds open the normally closed switch 164 breaking the circuit, as shown in FIGURE 4, to starter M–1–ST of loading conveyor motor M–1, thereby stopping the conveyor 12 after each linear loading travel. The loading conveyor motor M–1 is cyclically restarted by momentary closing of switch 166 which is controlled by suitable timing means (not shown) controlling the cyclical operation of the cooler 10 including the pusher 20 in well known manner, as shown for example, in the cyclical operation of the proofer of Temple Patent No. 2,866,565. Thus, upon momentary closing of switch 166, a circuit, see FIGURE 4, is completed to motor M–1 starter M–1–ST, whereupon cam 148 turns in the direction of the arrow to permit switch 164 to move off node 162 to effect closing of switch 164. Now, upon re-opening of momentarily closed switch 166, the circuit to motor M-1 starter M-1-ST is completed and maintained through switch 164.

Simultaneously with the starting of conveyor 12, which through the means above described effects closing of switch 164, it will be seen from FIGURE 4 that a circuit is completed to solenoid operated valve 96, actuating the same to provide for passage of air from supply line 168 through line 100 to the rearward end of air cylinder 88 of escapement means 76 to lower the gates 78 and permit the accumulated row of consolidated pans or spaced pans, as the case may be, to pass.

When the loading conveyor 12 makes a linear loading travel, in other words, when it has traveled a distance to move a pan from a point against the gates 78 to substantially the position A, and then stops, it is important that no pan or part of a pan is disposed between approximately the point indicated by the letter B and the gates 78 to prevent fouling of a pan against the side or other part of the cooler as the pusher 20 pushes a row of pans from the loading conveyor 12 onto the traveling means of the cooler. A gap must therefore be drawn between successive groups of not more than a predetermined number of pans so that the leading pan of a succeeding group is restrained by the clamping means 102 while the preceding group moves to a position between points A and B, and into which gap the gates 78 can be raised to restrain and orient the next group of pans upon opening of the clamping means 102. As previously noted, the clamping means is operated in timed relation with the operation of the gates 78, and this is controlled by the cam 146.

In the position of cam 146, as shown in FIGURE 4, the high part 170 holds the normally open switch 172 closed, thereby completing a circuit to solenoid operated valve 140 providing for passage of air from supply line 168 through line 144 to the forward end of air cylinder 136 to retain the clamping element 106 in pan releasing or open position. When the loading conveyor 12 starts, in the manner previously explained, the cam 146 rotates in the direction of the arrow, retaining the clamping element 106 in open position to permit pans to pass through the clamping means 102, and since the gates 78 drop simultaneously with the starting of loading conveyor 12, as previously explained, the pans are advanced by loading conveyor 12 into the cooler in front of pusher 20.

The cam 146 is formed with a valley 174, so that when the point X of the valley reaches the switch 172, the latter will open, thereby breaking the circuit to solenoid operated valve 140 providing for passage of air from supply line 168 through line 142 to the rearward end of air cylinder 136 to effect movement of the clamping element 106, through the means previously described, to pan clamping or closed position. The point X of the valley 174 of cam 146 is so located that it effects closing of the clamping element 106 to limit the number of pans to the maximum that can be accommodated between points A and B at the selected relative speeds of conveyors 12 and 14. When the cam 146 has completed one revolution to the position shown in FIGURE 4, the switch 172 will reclose causing the clamping element to return to open position, in the manner described above. At the same time, cam 148 has reached the position shown in FIGURE 4 to effect raising of the gates 78, as previously described to restrain the pans of a succeeding group while the released group of pans is pushed from loading conveyor 12 by the pusher 20, which is cyclically operated as shown, for example, in the above referred to Temple Patent No. 2,866,565.

The point X on the cam 146 at which clamping element 106 is caused to close, can readily be determined. Assuming for example, that in one linear loading travel of the loading conveyor 12 corresponding to one revolution of cam 146, we find that at the selected relative speeds of conveyors 12 and 14 a maximum of eight pans are accommodated in the space between point A and approximately the point B; then the point X on cam 146 should be so located that clamping element 106 closes on the ninth pan counting from the pan adjacent the gates 78, assuming the pans behind gates 78 to be in contiguous relation. If the pans are not in a solid row, as frequently occurs, the clamping element 106 will of course close just the same, and in that event there may be less than eight pans between points A and B.

In either event a gap is assured between the last pan of a group and the first pan of a succeeding group, so that when the loading conveyor 12 has completed its linear loading travel to place the first group of pans between points A and B, the cams 146 and 148 will have reached the position shown in FIGURE 4, whereupon the gates 78 will rise in the created gap and the clamping element 106 will simultaneously re-open. The succeeding group of pans are then free to move up to and be stopped by the gates 78, during which time the pusher 20 sweeps the first group of pans from loading conveyor 12. A new cycle of events will now occur when the switch 166, controlled by the cycle timer of the cooler, is again momentarily closed.

In order to adjust the point X of cam 146, it is formed in two parts which are relatively rotatable about the axis of shaft 150, one of the parts of the cam 146 being provided with a slot 176 for a bolt 178 for clamping the two parts of the cam in desired relationship.

It is important that the forward edge of the clamping element 106 be spaced more than a pan length from the gates 78, preferably about one and a half pan lengths of the maximum length of pan customarily employed by the bakery. It is apparent that should this distance be less than a pan length, a pan can be clamped by the clamping element 106 with its forward edge beyond the gates 78 when they move to raised position. This not only jars the pans so that in the case of flat bun pans, the position of the buns will be considerably dislocated or even bounced out of the pans, but it also dislocates the positions of the pans with respect to the loading conveyor 12 which, as before stated, is arranged to make one linear loading travel measured from the gates 78 to properly locate the pans in front of the pusher 20.

The use of the gates 78 in conjunction with the clamping means 102 is of particular importance when, as previously noted, the pans are so spaced that they do not pass between the clamping elements 104 and 106 in a solid group. Under such conditions, the clamping means 102 will not, each time it closes, clamp a pan at the same point between its forward and rearward ends, so that successive groups of pans will be out of phase with respect to the linear loading travel of the loading conveyor 12, and will not be properly located in front of the pusher 20.

It will be apparent from the above that the apparatus successfully handles the pans whether in a solid row or haphazardly spaced.

I claim:

1. Article grouping apparatus comprising conveyor means for conducting articles along a path; gate means supported for movements into and out of said path for respectively arresting and releasing articles on said conveyor means; first operating means for moving said gate means into and out of said path; article clamping means spaced upstream of said gate means and supported for movements into and out of clamping engagement with articles on said conveyor means; second operating means for moving said article clamping means into and out of article clamping engagement; and actuating means operable to effect sequential movement of said gate means out of said path and said clamping means into article clamping position and to effect simultaneous movement of said gate means into said path and said article clamping means out of article clamping engagement.

2. The apparatus set forth in claim 1 wherein the spacing between said gate means and said article engaging means is greater than the length of the articles to be grouped.

3. Article grouping apparatus comprising first conveyor means; means for driving said first conveyor means intermittently; second conveyor means for delivering and discharging articles to said first conveyor means; means for driving said second conveyor means continuously; gate means adjacent the discharge end of said second conveyor means supported for movements into and out of article arresting position; first operating means for moving said gate means into and out of said position; article clamping means supported upstream of said gate means for movements into and out of article clamping position; second operating means for moving said article clamping means into and out of said position; actuating means acting on said first and second operating means operable to effect simultaneous movement of said article clamping means out of article clamping position and said gate means into article engaging position and sequential movement of said gate means out of article engaging position and said article clamping means into article clamping position; and timing means reacting between said actuating means and said first conveyor means and operable in response to predetermined movement of the latter to actuate said actuating means.

4. Apparatus as set forth in claim 3 wherein the driving means for said first conveyor means drives the latter at a faster rate of speed than the driving means for said second conveyor means drives the latter.

5. Apparatus as set forth in claim 3 wherein the spacing between said gate means and said article clamping means is greater than the length of the articles to be grouped.

References Cited by the Examiner
UNITED STATES PATENTS

| | | | |
|---|---|---|---|
| 683,039 | 9/01 | Hagen | 198—76 X |
| 1,872,000 | 8/32 | Keller et al. | 198—34 X |
| 2,823,811 | 2/58 | Temple | 214—16.4 |

SAMUEL F. COLEMAN, *Primary Examiner.*

WILLIAM B. LA BORDE, ERNEST A. FALLER, Jr., *Examiners.*